United States Patent
Zheng et al.

(10) Patent No.: US 8,706,158 B2
(45) Date of Patent: Apr. 22, 2014

(54) MOBILE PHONE FOR AUTHENTICATING SIM CARD AND METHOD THEREOF

(75) Inventors: Zhang-Yong Zheng, Shenzhen (CN); Bi-Qing Luo, Shenzhen (CN); Huan-Huan Zhang, Shenzhen (CN); Xin Lu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 84 days.

(21) Appl. No.: 13/340,714

(22) Filed: Dec. 30, 2011

(65) Prior Publication Data

US 2013/0157715 A1 Jun. 20, 2013

(30) Foreign Application Priority Data

Dec. 15, 2011 (CN) .......................... 2011 1 0420814

(51) Int. Cl.
*H04M 1/00* (2006.01)
(52) U.S. Cl.
USPC ........ 455/551; 455/411; 455/558; 455/414.1; 455/418; 455/566

(58) Field of Classification Search
USPC .............. 455/551, 411, 558, 414.1, 418, 566
See application file for complete search history.

(56) References Cited

U.S. PATENT DOCUMENTS

| 6,141,563 | A | * | 10/2000 | Miller et al. | 455/558 |
| 8,229,505 | B2 | * | 7/2012 | Wong | 455/558 |
| 2008/0113651 | A1 | * | 5/2008 | Choi | 455/411 |
| 2009/0191846 | A1 | * | 7/2009 | Shi | 455/411 |
| 2009/0328144 | A1 | * | 12/2009 | Sherlock et al. | 726/2 |

* cited by examiner

*Primary Examiner* — Sanh Phu
(74) *Attorney, Agent, or Firm* — Novak Druce Connolly Bove + Quigg LLP

(57) ABSTRACT

The present invention provides a mobile phone for authenticating Subscriber Identification Module (SIM) card and a SIM card authentication method adapted for the mobile phone. Once a SIM card is inserted into the mobile phone, the mobile phone acquires a phone number associated with the inserted SIM card and identifies whether the acquired phone number has been stored in the non-erasable programmable memory of the mobile phone. If yes, the user is legal and can use the mobile phone, if no, then the user is illegal and cannot use the mobile phone. Therefore, the mobile phone protects and hides stored information from the user.

12 Claims, 3 Drawing Sheets

MOBILE PHONE FOR AUTHENTICATING SIM CARD AND METHOD THEREOF

BACKGROUND

1. Technical Field

The disclosure relates to mobile phones and, more particularly, to a mobile phone for authenticating Subscriber Identification Module (SIM) card and a SIM card authentication method adapted for the mobile phone.

2. Description of Related Art

With trends towards miniaturization of mobile phones are becoming popular, smaller mobile phones are easy to be lost or stolen. Therefore, information stored in the mobile phone about the owner of the mobile phone may be illegally accessed, which may result in loss or privacy intrusion for the owner.

Therefore, what is needed is a mobile phone for authenticating SIM card to overcome the described shortcoming.

DETAILED DESCRIPTION

Figure 1:
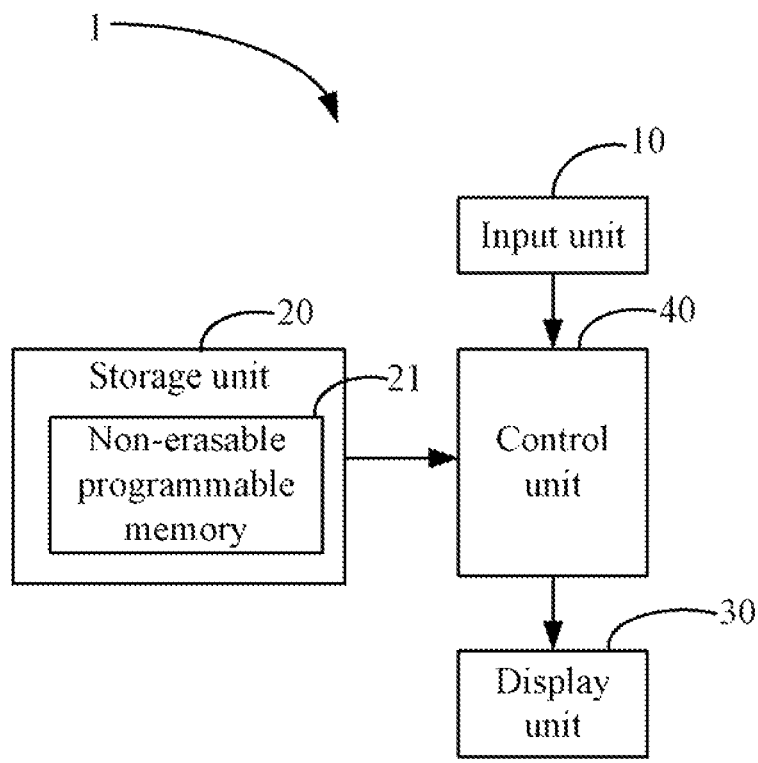
FIG. 1 is a block diagram of a mobile phone for authenticating SIM card in accordance with an exemplary embodiment.

FIG. 1 is a block diagram of a mobile phone for authenticating SIM card in accordance with an exemplary embodiment. The mobile phone for authenticating SIM card (hereinafter "mobile phone") 1 includes an input unit 10, a storage unit 20, a display unit 30, and a control unit 40. The input unit 10 generates input signals in response to user inputs. The storage unit 20 includes a non-erasable programmable memory 21 and an erasable programmable memory (not shown). The non-erasable programmable memory 21 stores non-erasable information, such as an International Mobile Equipment Identity (IMEI) number of the mobile phone 1. The erasable programmable memory stores erasable information, such as a predefined ringtone of an incoming call.

When the mobile phone 1 is restored to factory settings or updated the system of the mobile phone, the information of the erasable programmable memory will be deleted or the same as the factory settings, whereas the information of the non-erasable programmable memory 21 cannot be deleted and is permanently stored in the mobile phone 1. The display unit 30 displays information. The control unit 40 controls the mobile phone 1.

Figure 2:
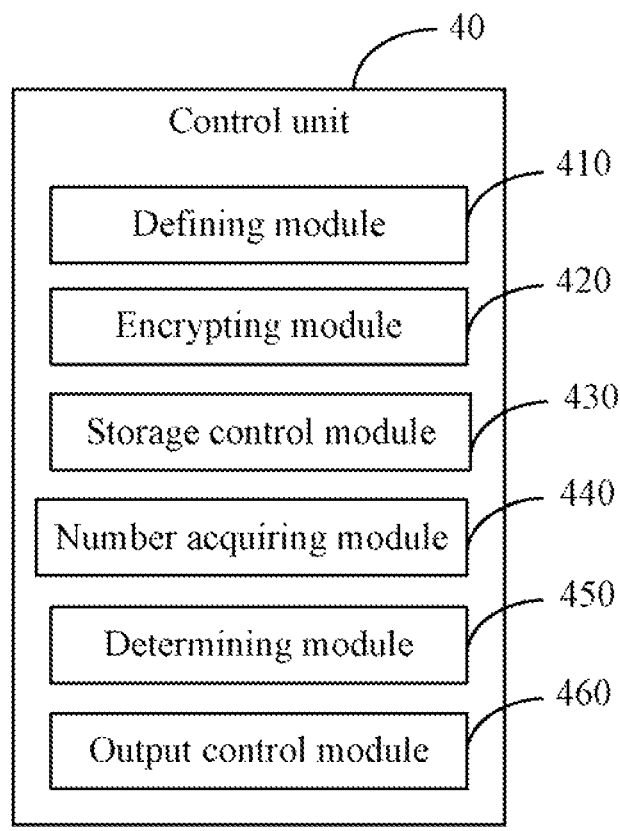
FIG. 2 is a block diagram of a control unit of the mobile phone of FIG. 1.

As shown in FIG. 2, the control unit 40 further includes a defining module 410, an encrypting module 420, a storage control module 430, a number acquiring module 440, a determining module 450, and an output control module 460.

The defining module 410 controls the display unit 30 to display a user interface and defines at least one phone number in the user interface in response to user inputs from the input unit 10, wherein each of the at least one phone number corresponds to a SIM card. For example, the defining module 410 defines three phone numbers of three SIM cards in the user interface, such as, a first phone number corresponding to a user of the mobile phone 1, a second phone number corresponding to the wife of the user, and a third phone number corresponding to the child of the user. The defining operation from the defining module 410 can be performed when the user starts to use the mobile phone 1 the first time or in the course of using the mobile phone 1.

The encrypting module 420 encrypts the user interface after the defining module 410 defines the at least one phone number in the user interface. For example, the encrypting module 420 sets a password for the user interface in response to user inputs, that is, if a user enters the right password for the user interface, the user can look at, change, or delete contents (i.e., the at least one phone number) of the user interface. The storage control module 430 controls to store the at least one phone number defined in the defining module 410 in the non-erasable programmable memory 21.

When a SIM card is inserted to the mobile phone 1 and the mobile phone 1 is powered on, for example, the wife of the user wants to use the mobile phone 1, the number acquiring module 440 acquires a phone number associated with the inserted SIM card. The determining module 450 compares the acquired phone number with the at least one phone number in the non-erasable programmable memory 21 and determines whether the non-erasable programmable memory 21 stores the phone number of the inserted SIM card. If the determining module 450 determines that the non-erasable programmable memory 21 has stored the phone number of the inserted SIM card, that is, the phone number is from a legal user, the output control module 460 controls the display unit 30 to display information, which prompts authentication success, for example, the information "registry is ok and mobile phone can be used". If the determining module 450 determines that the phone number of the inserted SIM card does not exist in the non-erasable programmable memory 21, that is, the phone number is from an illegal user, the output control module 460 controls the display unit 30 to display information, which prompts authentication fail, for example, the information "registry has failed and use of mobile phone is not authorized".

Figure 3:
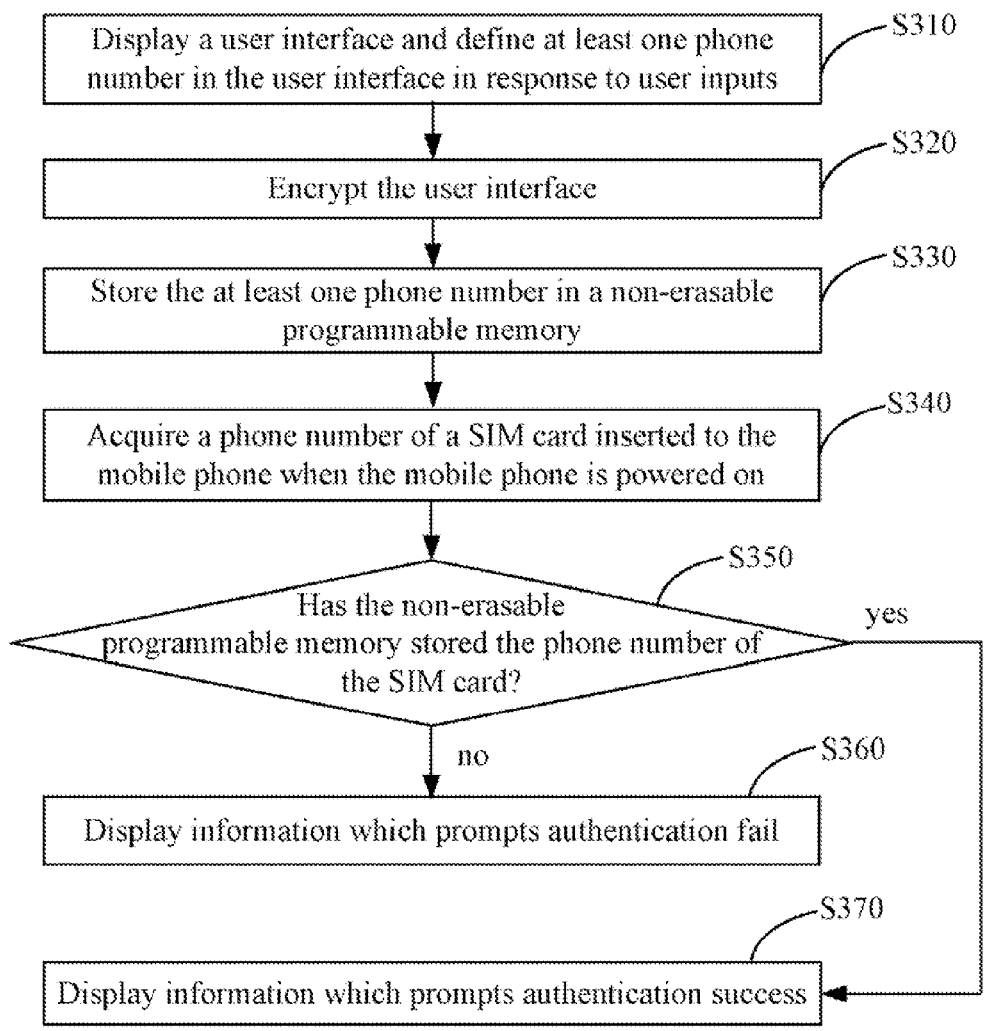
FIG. 3 is a flowchart of authenticating SIM card method adapted for the mobile phone of FIG. 1.

FIG. 3 is a flowchart of authenticating SIM card method adapted for the mobile phone of FIG. 1. In step S310, the defining module 410 controls the display unit 30 to display the user interface and defines the at least one phone number in the user interface in response to user inputs using the input unit 10. In step S320, the encrypting module 420 encrypts the user interface after the defining operation from the defining module 410. In step S330, the storage control module 430 stores the defined at least one phone number from the defining module 410 in the non-erasable programmable memory 21. In step S340, when a SIM card is inserted to the mobile phone 1 and the mobile phone 1 is powered on, the number acquiring module 440 acquires a phone number of the inserted SIM card. In step S350, the determining module 450 compares the phone number with the at least one phone number in the non-erasable programmable memory 21 and determines whether the non-erasable programmable memory 21 has stored the phone number of the inserted SIM card.

In step S370 if the determining module 450 determines that the phone number of the inserted SIM card has been stored in the non-erasable programmable memory 21, the output control module 460 controls the display unit 30 to display the information, which prompts authentication success. In step S360 if the determining module 450 determines that the phone number of the inserted SIM card does not exist in the non-erasable programmable memory 21, the output control module 460 controls the display unit 30 to display the information, which prompts authentication fail.

Once a SIM card is inserted into the mobile phone 1, the mobile phone 1 acquires a phone number associated with the inserted SIM card and identifies whether the acquired phone number has been stored in the non-erasable programmable memory 21 of the mobile phone. If yes, the user is legal and can use the mobile phone, or the user is illegal and cannot use the mobile phone. Therefore, the mobile phone 1 protects and hides stored information from the user.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone comprising:
   an input unit for generating input signals in response to user inputs;
   a non-erasable programmable memory for storing at least one phone number, wherein each of the at least one phone number corresponds to a SIM card;
   a display unit for displaying information; and
   a control unit, further comprising:
      a number acquiring module for acquiring a phone number of a SIM card inserted to the mobile phone when the mobile phone is powered on;
      a determining module for comparing the acquired phone number with the at least one phone number in the non-erasable programmable memory and determining whether the non-erasable programmable memory has stored the phone number of the inserted SIM card; and
      an output control module for controlling the display unit to display information which prompts authentication success and authorizing a use of the mobile phone when the determining module determines that the non-erasable programmable memory has stored the phone number of the inserted SIM card, and for controlling the display unit to display information which prompts authentication fail and not authorizing a use of the mobile phone when the determining module determines that the phone number of the inserted SIM card does not exist in the non-erasable programmable memory.

2. The mobile phone as recited in claim 1, wherein the control unit further comprises a defining module for controlling the display unit to display a user interface and defining the at least one phone number in the user interface in response to user inputs from the input unit.

3. The mobile phone as recited in claim 2, wherein the defining operation from the defining module can be performed when the user starts to use the mobile phone the first time or in the course of using the mobile phone.

4. The mobile phone as recited in claim 2, wherein the control unit further comprises an encrypting module for encrypting the user interface after the defining module defines the at least one phone number in the user interface.

5. The mobile phone as recited in claim 4, wherein the encrypting module sets a password for the user interface in response to user inputs, if a user enters the right password for the user interface, the user can look at, change, or delete the at least one phone number of the user interface.

6. The mobile phone as recited in claim 2, wherein the control unit further comprises a storage control module for storing the at least one phone number defined the defining module in the non-erasable programmable memory.

7. A SIM card authentication method adapted for a mobile phone, wherein the mobile phone comprises a non-erasable programmable memory for storing at least one phone number, and each of the at least one phone number corresponds to a SIM card, the method comprising:
   acquiring a phone number of a SIM card inserted to the mobile phone when the mobile phone is powered on;
   comparing the acquired phone number with the at least one phone number in the non-erasable programmable memory and determining whether the non-erasable programmable memory has stored the phone number of the inserted SIM card; and
   displaying information which prompts authentication success and authorizing a use of the mobile phone if the non-erasable programmable memory has stored the phone number of the inserted SIM card, and displaying information which prompts authentication fail and not authorizing a use of the mobile phone if the phone number of the inserted SIM card does not exist in the non-erasable programmable memory.

8. The SIM card authentication method as recited in claim 7, further comprising:
   displaying a user interface and defining the at least one phone number in the user interface in response to user inputs.

9. The SIM card authentication method as recited in claim 8, wherein the defining step can be performed when the user starts to use the mobile phone the first time or in the course of using the mobile phone.

10. The SIM card authentication method as recited in claim 8, further comprising:
    encrypting the user interface after defining the at least one phone number.

11. The SIM card authentication method as recited in claim 10, wherein the encrypting step is "setting a password for the user interface in response to user inputs", if a user enters the right password for the user interface, the user can look at, change, or delete the at least one phone number of the user interface.

12. The SIM card authentication method as recited in claim 8, further comprising:
    storing the defined at least one phone number in the non-erasable programmable memory.

* * * * *